(12) United States Patent
Kim

(10) Patent No.: US 9,773,400 B1
(45) Date of Patent: Sep. 26, 2017

(54) POLE TYPE PROTECTOR FOR RACK PROTECTION

(71) Applicant: Jin Ok Kim, Seoul (KR)

(72) Inventor: Jin Ok Kim, Seoul (KR)

( * ) Notice: Subject to any disclaimer, the term of this patent is extended or adjusted under 35 U.S.C. 154(b) by 0 days.

(21) Appl. No.: 15/338,741

(22) Filed: Oct. 31, 2016

(51) Int. Cl.
  *G08B 21/00* (2006.01)
  *G08B 21/18* (2006.01)
  *A47B 97/00* (2006.01)

(52) U.S. Cl.
  CPC .............. *G08B 21/18* (2013.01); *A47B 97/00* (2013.01)

(58) Field of Classification Search
  CPC ... G08B 21/18; A47B 97/00; A63B 2071/024; A63B 2225/09; A63B 61/02; E01F 9/681; E04H 12/2261
  USPC ....... 340/686.1, 686.6, 10.52; 248/218.4, 30, 248/220.21; 404/10, 13; 40/607.1, 608
  See application file for complete search history.

(56) References Cited

U.S. PATENT DOCUMENTS

| | | | | |
|---|---|---|---|---|
| 4,269,534 A * | 5/1981 | Ryan | ........................ | E01F 9/675 256/1 |
| 5,197,819 A * | 3/1993 | Hughes | .................... | E01F 9/681 116/63 R |
| 6,745,529 B2 * | 6/2004 | Beltran | ..................... | E04C 3/30 248/529 |
| 9,004,439 B2 * | 4/2015 | Gross | .................. | E04H 12/2261 248/507 |
| 2006/0022189 A1 * | 2/2006 | Collins | ................... | E04H 17/20 256/65.14 |
| 2010/0229415 A1 * | 9/2010 | Knudsen | .................. | G01D 1/00 33/613 |
| 2014/0243119 A1 * | 8/2014 | Whalen | .................. | A63B 61/02 473/493 |

FOREIGN PATENT DOCUMENTS

KR   101296162   8/2013

* cited by examiner

*Primary Examiner* — Anh V La
(74) *Attorney, Agent, or Firm* — IPLA P.A.; James E. Bame

(57) ABSTRACT

Provided is a pole type protector for a rack protection, which may include a tubular column member which is spaced-apart from a rack and is installed upright on a floor; a tubular clamp which is configured to fixedly insert the lower end of the column member; an impact absorption member which is configured to seat and support the lower end of the tubular clamp on the upper surface thereof, wherein the lower surface thereof is disposed contacting with the floor, and an inner hollow part is formed in the central direction, and the impact absorption member is made of an elastic material; and a flange type support member which is fixed at the floor while passing through the tubular clamp and is configured to fix together the lower end of the tubular clamp and the impact absorption member.

2 Claims, 7 Drawing Sheets

POLE TYPE PROTECTOR FOR RACK PROTECTION

BACKGROUND

The present invention relates to a pole type protector for a rack protection, and in particular to a pole type protector for a rack protection which is able to provide the structural stability of a rack in such a way to previously absorb an external impact which might be applied to the rack.

A rack structure (hereinafter referred to a rack), in general, is used to effectively display the products in a box or a pallet at a distribution warehouse, a warehouse type shop, etc. or to store goods.

The rack is formed of a plurality of rack posts which are installed vertical and are disposed at set intervals, a load beam which is installed crossing in the horizontal direction the posts, and a tie beam installed crossing the load beams.

The rack is installed in a complicated or stable structure depending on the purpose of its installation. If the rack causes a collision with a predetermined movable meaning which is being driven near the rack, it may become hard to secure the structural stability of the rack.

For this reason, it needs to develop a new device which is able to stably protect the rack even though a predetermined movable means which is being driven near the rack, collides with the rack after it has been deviated from its set driving route.

As a prior art related with the present invention, the Korean patent registration number 10-1296162 (the laid-open date is Aug. 19, 2013) describes a technology on the rack post protection apparatus.

SUMMARY OF THE INVENTION

Accordingly, it is an object of the present invention to provide a pole type protector for a rack protection which is able to secure the structural stability of a rack with the aid of an elastic movement within a set range if a large impact is applied from the outside.

It is another object of the present invention to provide a pole type protector for a rack protection which is able to protect any collision by informing a worker or an operator of a collision in such a way to generate an alarm sound when a work vehicle, etc. approaches the rack from the outside.

The solutions to be resolved by the present invention are not limited to the aforementioned solutions, and other solutions could be obvious to a person having ordinary skill in the art from the following descriptions.

To achieve the above objects, there is provided a pole type protector for a rack protection, which may include, but is not limited to, a tubular column member which is spaced-apart from a rack and is installed upright on a floor; a tubular clamp which is configured to fixedly insert the lower end of the column member; an impact absorption member which is configured to seat and support the lower end of the tubular clamp on the upper surface thereof, wherein the lower surface thereof is disposed contacting with the floor, and an inner hollow part is formed in the central direction, and the impact absorption member is made of an elastic material; and a flange type support member which is fixed at the floor while passing through the tubular clamp and is configured to fix together the lower end of the tubular clamp and the impact absorption member. The tubular clamp includes a tubular body which is provided at the upper end of the tubular clamp and is equipped with a column member insertion hole into which the lower end of the column member is inserted, and an outer diameter extension part which is provide at the lower end of the tubular clamp and expands outward, thus having an outer diameter larger than the tubular body. A plurality of screw engaging holes are formed along the outer circumferential surface of the tubular body, and the lower end of the column member is inserted through the column member insertion hole, and a plurality of screws are engaged using a plurality of screw engaging holes, thus fixing the lower end of the column member and the tubular body.

Here, the impact absorption member is configured in such a way that the upper surface thereof on which the lower end of the tubular clamp is seated and the lower surface thereof contacting with the ground are formed flat, and the outer diameter of the upper surface of the impact absorption member is same as or smaller than the lower end of the tubular clamp, and the outer diameter of the lower surface of the impact absorption member is formed larger than the upper surface of the impact absorption member and is configured in the shape expanded outward.

Moreover, the flange type support member includes an upper end cover equipped with a stepped part at the top thereof so as to fixedly hook the outer diameter extension part of the tubular clamp, and a lower end fixing plate which expands outward from the lower side of the upper end cover and is equipped with a plurality of fixing bolt engaging holes to engage a plurality of fixing bolts toward the ground of the floor, and an inclined joint part inclined to reinforce the structure is further provided between the upper end cover and the lower end fixing plate.

Meanwhile, the pole type protector for a rack protection is provided in a fence type by including a horizontal connection member configured to connect at least a pair of the column member in the horizontal direction, and an extendable member is provided at the longitudinal inner side of the horizontal connection member, wherein it can be extendable in the longitudinal direction in cooperation with the movement of the column member.

In addition, the pole type protector for a rack protection of the present invention may further include a cap which includes a main body, and a support part which forms an engaging space part at the lower surface of the main body, wherein an engaging shoulder is formed integral at an end thereof, and the cap is attached detachable to the top of the column member; and a sensor module which includes a speaker and a detection sensor and operates by a battery, wherein a sensor module is installed at the engaging space part and is fixed by the engaging shoulder, by which an alarm sound can be generated if a worker, etc. approaches, and the worker can be informed of any approaching, thus protecting collisions.

According to the embodiments of the present invention, the structural stability of a rack can be obtained with the aid of an elastic movement within a set range if a large impact is applied from the outside.

Moreover, according to the embodiments of the present invention, the installation work is easy at the periphery of the rack, and an installation work time can be significantly reduced.

If a predetermined work vehicle approaches a rack, a detection sensor of a sensor module detects such an approaches, and an alarm sound can be generated through a speaker, so a worker can be informed of any possible danger, thus preventing collisions.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE INVENTION

The advantages and features of the present invention and ways to achieve the present invention would be apparent with reference to the embodiments which are described together with the accompanying drawings. The present invention, however, is not limited to such embodiments, and may be implemented into various forms, and these embodiments are intended to allow the disclosures of the present invention to be complete and to inform a person having ordinary skill in the art to recognize such a range, and the present invention should be defined only by means of the right scopes of the claims. The same reference numbers throughout the specification mean the same components.

Moreover, while the embodiments of the present invention are being described, if it is judged that the descriptions on the known functions or configuration might make unclear the subject matters of the present invention, such descriptions will be omitted. The terms used throughout the specification are defined based on the functions in the embodiments, and may be changed by a user or operator's intention or custom, for which the definitions on such terms should be carried out based on the whole contents of the present specification.

The pole type protector for a rack protection according to the present invention will be described with reference to the accompanying drawings.

Figure 1:
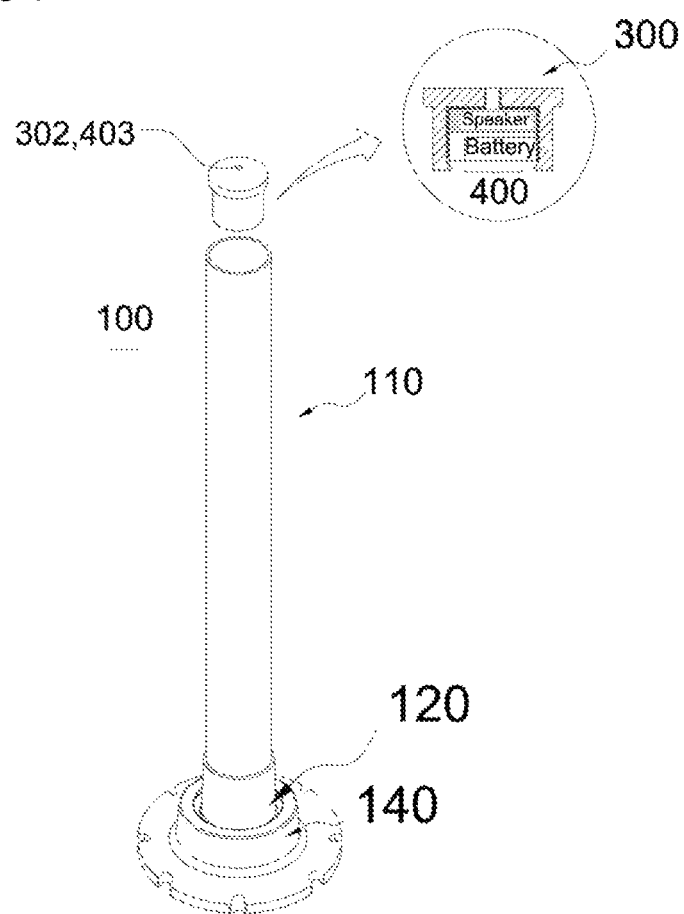
FIG. 1 is a perspective view illustrating a pole type protector for a pole protection according to an embodiment of the present invention.
Figure 2:
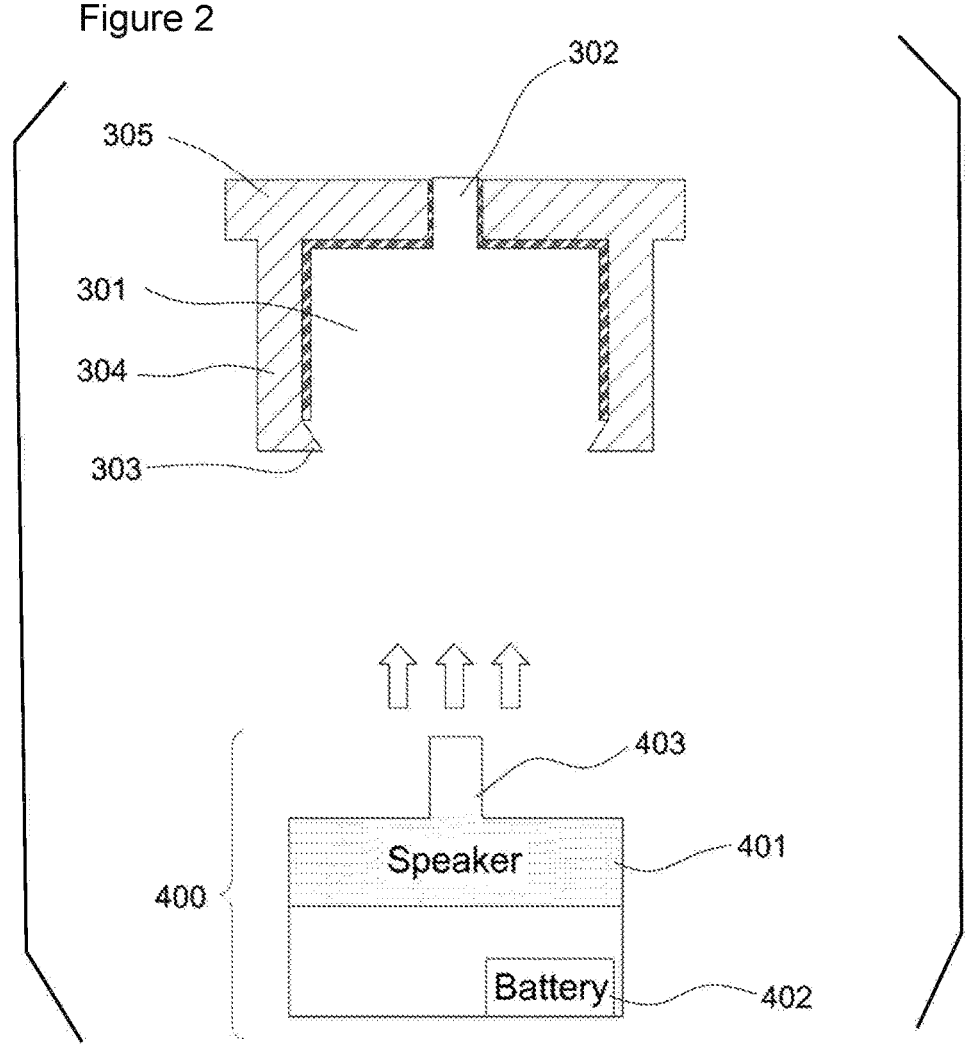
FIG. 2 is a cross sectional view illustrating a cap of a pole type protector for a rack protection according to an embodiment of the present invention.

FIG. 1 is a perspective view illustrating a pole type protector for a pole protection according to an embodiment of the present invention.

Referring to FIG. 1, the pole type protector (hereinafter referred to a pole type protector) 100 for a rack protection may include, but is not limited to, a tubular column member 110, a tubular clamp 120, an impact absorption member 130 (refer to FIG. 3) and a flange type support member 140.

Figure 3:
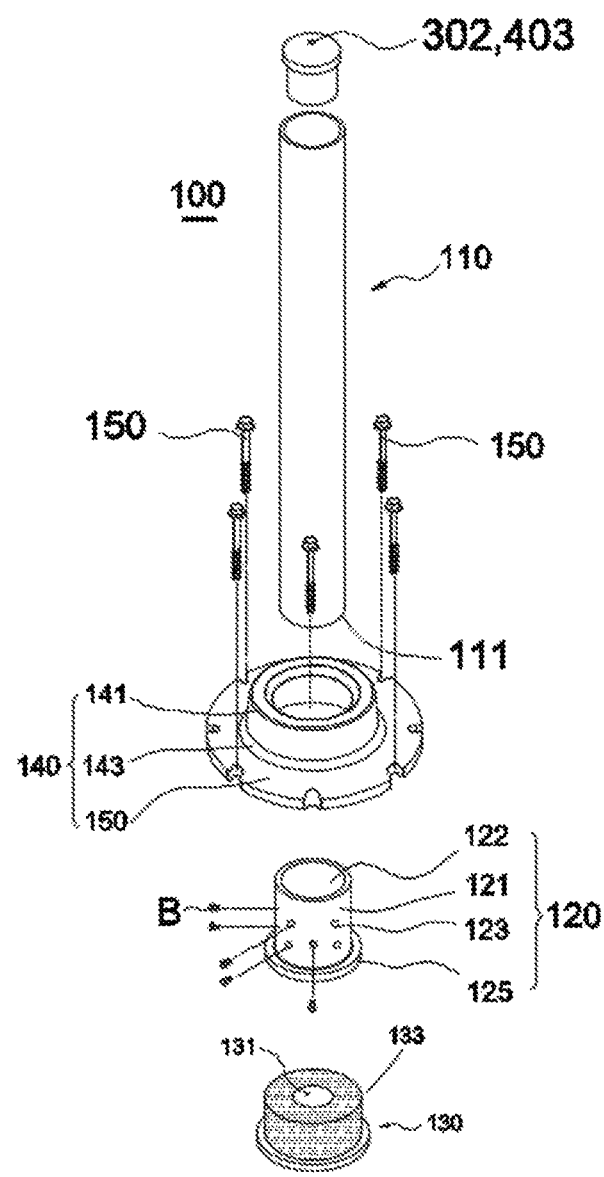
FIG. 3 is a detailed perspective view illustrating a pole type protector for a rack protection according to an embodiment of the present invention.
Figure 4:
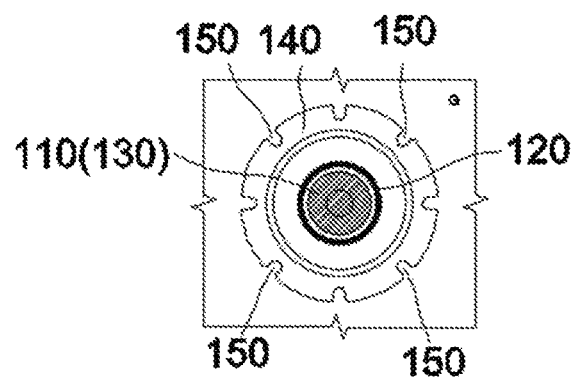
FIG. 4 is an installation plane view illustrating a pole type protector for a rack protection according to the present invention.

FIG. 3 is a detailed perspective view illustrating a pole type protector for a rack protection according to an embodiment of the present invention, and FIG. 4 is an installation plane view illustrating a pole type protector for a rack protection according to the present invention.

Referring to FIGS. 3 and 4, the column member 110, the tubular clamp 120, the impact absorption member 130 and the flange type support member 140 which collectively form the pole type protector 100 for a rack protection will be described.

The tubular column member 110 is a member which is installed protruding from the floor (namely, the ground). The shape and material of the tubular column member 119 may be implemented in various forms. For example, a detachable cap 300 may be provided at the top of the column member 110. This configuration may be implemented in a rounded form, without using the cap 300.

Figure 10:
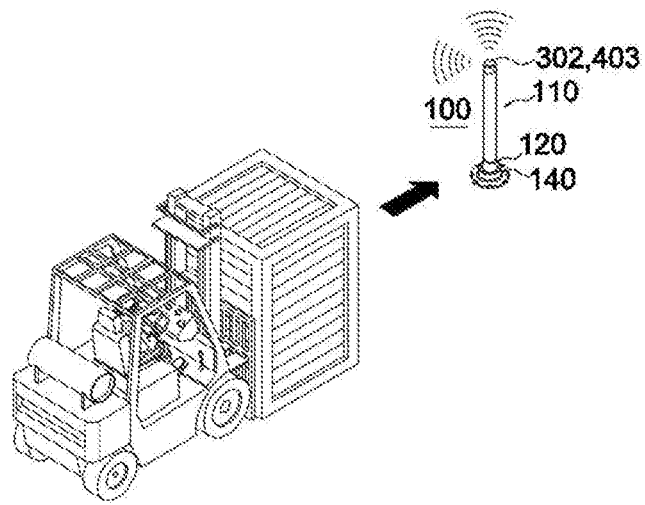
FIG. 10 is a view illustrating a state where a worker is informed of any possible danger, which is approaching a pole type protector for a rack protection according to an embodiment of the present invention.
Figure 11:
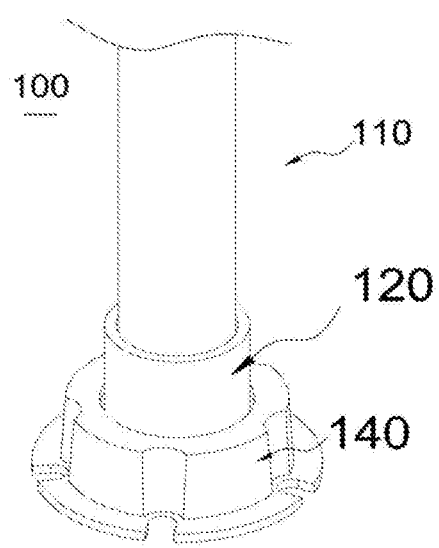
FIG. 11 is a view for describing an implementation of a pole type protector for a rack protection according to the present invention.

The cap may include a main body 305 and a support part 304. The cap can be engaged detachable to the top of the tubular column member 110. The support part 304 engaged to the lower surface of the cap may form an engaging space part 301. An engaging shoulder 303 may be provided integral at an end of the support part 304. A sensor module 400 driven by a battery 402 may be installed at the engaging space part formed at the lower surface of the cap and may include a speaker 401 embedded in a sensor module, and a detection sensor 403 engaged protruding. The sensor module is engaged to the engaging space part, and the detection sensor 403 is exposed to the outside after it has passed through a protrusion perforated part 302 of the cap main body. The sensor module 400 may be fixedly installed with the air of the engaging shoulder 303. As illustrated in FIG. 10, the detection sensor of the sensor module installed at the lower surface of the cap is configured to detect a work vehicle, etc. approaching, and activate the speaker of the sensor module so as to inform a worker of the approaching, thus minimizing any accidents.

The tubular clamp 120 is referred to a member which fixedly inserts the lower end of the column member 110.

The tubular clamp may include a tubular body 121, and an outer diameter extension part 135.

The tubular body 121 may be provided at the top of the tubular clamp 120. A column member insertion hole 122 into which the lower end (reference number 111 in FIG. 3) is inserted, may be formed in the center of the inner side of the tubular body 121.

Moreover, a plurality of screw engaging holes 123 may be formed along the outer circumferential surface of the tubular body 121.

The lower end 111 of the column member is inserted through the column member insertion hole 122, and then a plurality of screws (B) are inserted through a plurality of screw engaging holes 123 and are engaged, by which the column member 110 and the tubular body 121 can be fixed together stable.

In addition, if it needs to separate and repair the column member 110 or to exchange it with a new one, a plurality of the screws (B) are loosened, and the installed state of the column member 110 may be disassembled or it can be easily exchanged.

The impact absorption member 130 is able to seat and support the lower end of the tubular clamp 120 through the upper surface thereof, and the lower surface thereof is made of an elastic material which is disposed contacting with the ground. For example, various combined materials of other elastic materials, springs, etc. may be employed.

In the impact absorption member 130, the upper surface 133 on which the lower end of the tubular clamp 120 is seated, and the lower surface contacting with the ground may be preferably formed flat.

The outer diameter of the upper surface 133 of the impact absorption member may be determined same as or larger than the lower end of the tubular clamp 120. The outer diameter of the lower surface thereof may be determined larger than the upper surface, so it can be expandable to the outside.

The impact absorption member is able to stably seat the tubular clamp and can be disposed stable contacting with the ground.

Meanwhile, an inner hollow part 131 may be formed in the direction of the center of the impact member 130.

The impact absorption member 130 may have different materials for each portion. For example, the upper side of the impact absorption member 130 may be made of a material which has a relatively large elastic deformation, and the lower side of the impact absorption member 130 may be made of a material which has a relatively small elastic deformation, which configurations are employed so as to effectively absorb the external impacts transferred from the column member 110 and the tubular clamp 120.

The impact absorption member 130 may be provided in a honeycomb-shaped inner structure. This configuration is also employed to enhance the impact absorption effects.

The impact absorption member 130 may be provided in the form of a spring or in the form of a spring which has been embedded in the aforementioned material.

The flange type support member 140 may be fixed on the ground after it has passed through the tubular clamp 120 and is referred to a member which is able to fix together the lower end of the tubular clamp 120 and the impact absorption member 130.

As a preferred example, the flange type support member 140 is configured in a unique circular shape, which is able to absorb impacts in all directions. The flange type support member 140 is able to select and fix the position of the fixing bolt 150.

The flange type support member 140 may include an upper end cover 141, and a lower end fixing plate 145.

A stepped part may be provided at the top of the upper end cover 141 so as to fixedly engage the outer diameter extension part 125 of the tubular clamp 120.

The tubular body 121 provided at the top of the tubular clamp 120 protrudes upward through the hollow part of the upper end cover 141, and the outer diameter extension part 125 formed at the lower end of the tubular clamp 120 may be fixedly hooked by the stepped part.

The lower end fixing plate 145 may be expanded outward from the lower side of the upper end cover 141. For example, it may be provided in a circular plate shape as illustrated in FIG. 3.

The lower end fixing plate 145 may include a plurality of fixing bolt engaging holes in the direction of the ground so as to engage a plurality of fixing bolts 150.

An inclined joint part 143 may be further provided between the upper end cover 141 and the lower end fixing plate 145, wherein the inclined joint part 143 is connected inclined so as to reinforce the structure. The inclined joint part 145 may be formed in a rounded shape.

FIG. 3 is a cross sectional view illustrating a state where the column member 110, the tubular clamp 120, the impact absorption member 130 and the flange type support member 140 are installed on the ground (G).

Figure 5:
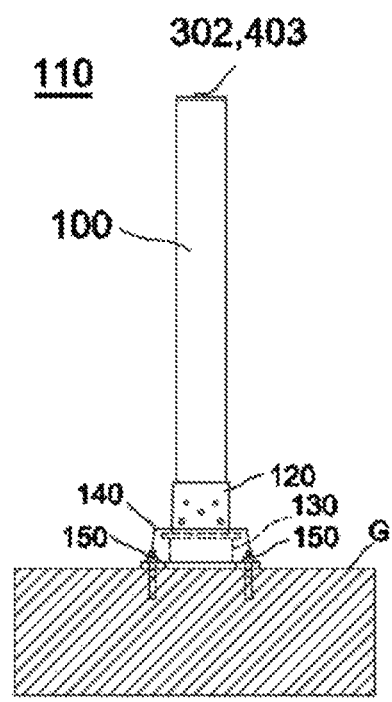
FIG. 5 is an installation cross sectional view illustrating a pole type protector for a rack protection according to an embodiment of the present invention.
Figure 6:
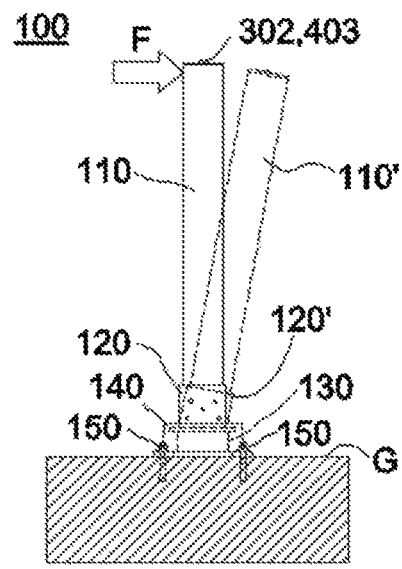
FIG. 6 is a view illustrating a state where an external impact has been applied to a pole type protector for a rack protection according to an embodiment of the present invention.

FIG. 5 is an installation cross sectional view illustrating a pole type protector for a rack protection according to an embodiment of the present invention, and FIG. 6 is a view illustrating a state where an external impact has been applied to a pole type protector for a rack protection according to an embodiment of the present invention.

Referring to FIG. 5, the pole type protector 100 for a rack protection may be installed on the ground (G). For example, it may be installed at various facilities, for example, a factory, a warehouse, etc. It may be installed at the road so as to provide safety-related functions to a pedestrian and a vehicle operation.

Referring to FIG. 6, it shows that an external impact, namely, an external force (F) has been applied to the pole type protector 100 for a rack protection.

If an external force is applied to the column member 110, the tubular clamp 120 at which the column member 110 has been fixed, will press in one direction the impact absorption member 130 at the lower side thereof in a state where it has been caught within the flange type support member 140, thus allowing the column member 110 to incline toward one side.

The column member 110 may be fixed freely movable in the inclined state based on the elastic movement of the impact absorption member 130.

In this way, the present invention is able to prevent a partial damage or the whole damages due to an external impact or a permanent deformation, thus saving any costs related with the exchange with a new component.

The pole type protector 100 for a rack protection may be provided in a fence type according to an embodiment of the present invention.

Figure 7:
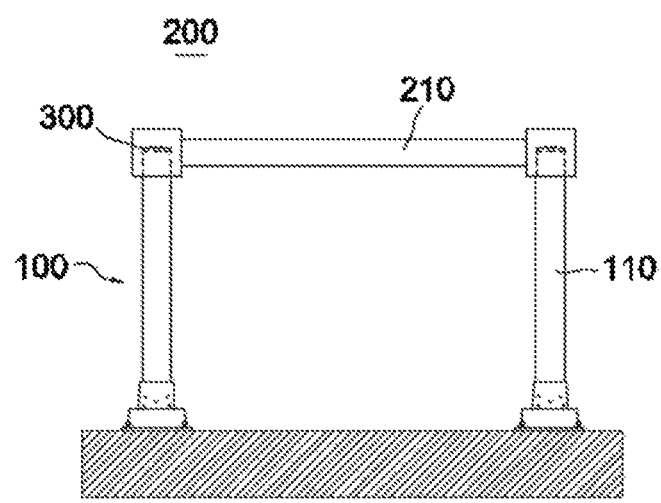
FIG. 7 is a schematic view illustrating a state where a horizontal connection member has been installed at a pole type protector for a rack protection according to the present invention.

FIG. 7 is a schematic view illustrating a state where a horizontal connection member has been installed at a pole type protector for a rack protection according to the present invention.

Referring to FIG. 7, the present invention may be implemented with a fence type pole type protector 200 including a horizontal connection member 210 which interconnects horizontally a pair of the column members 110.

The configuration where the horizontal connection member 210 is connected to the tops of a pair of the column members 110 is not limited thereto. It may be tied and installed in various ways.

Figure 8:
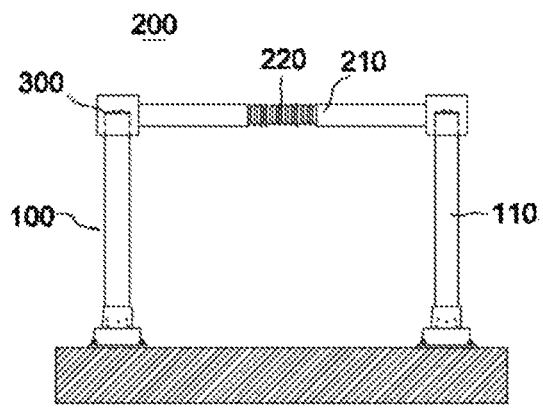
FIG. 8 is a view illustrating a state where an extendable member has been installed at a longitudinal inner side of the horizontal connection member in FIG. 7.

FIG. 8 is a view illustrating a state where an extendable member has been installed at a longitudinal inner side of the horizontal connection member in FIG. 7.

FIG. 8 shows a configuration where an extendable member is provided at the longitudinal inner side of the horizontal connection member in FIG. 7.

Referring to FIG. 8, an extendable member 220 may be further provided at the horizontal connection member 210 described in conjunction with FIG. 7.

The extendable member 220 is referred to a member which is provided at the longitudinal inner side of the horizontal connection member 210, wherein the length thereof can be extended or contracted in the horizontal direction. Since the extendable member 220 can be extendable in the longitudinal direction, any structure breaking or damage can be prevented if an external impact is applied to the column member 110.

Figure 9:
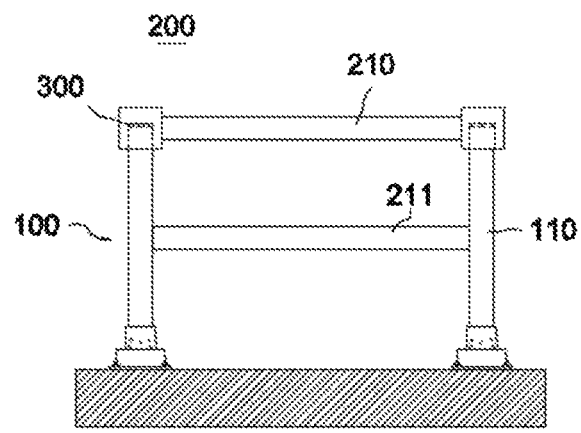
FIG. 9 is a view illustrating a state where a plurality of the connection members in FIG. 7 have been installed.

FIG. 9 is a view illustrating a state where a plurality of the connection members in FIG. 7 have been installed.

Referring to FIG. 9, a plurality of horizontal connection members 210 and 211 are installed at the top of and in the middle of the column members 110.

Not illustrated in the drawings, at least one extendable member 220 may be provided at the longitudinal inner side of each of a plurality of the horizontal connection members 210 and 211, whereupon any structural breaking or damage can be prevented even though impacts are applied to the column member.

According to the configuration and operation of the present invention, it is possible to secure the structural stability of a rack with the aid of the elastic movement within a set range if an external larger impact is applied.

Moreover, according to the embodiment of the present invention, the installation work is easy at the periphery of the rack, and the installation work time can be greatly reduced.

So far, the pole type protector for a rack protection has been described.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A pole type protector for a rack protection, comprising:
a tubular column member which is spaced-apart from a rack and is installed upright on a floor;
a tubular clamp which is configured to fixedly insert the lower end of the column member;
an impact absorption member which is configured to seat and support the lower end of the tubular clamp on the upper surface thereof, wherein the lower surface thereof is disposed contacting with the floor, and an inner hollow part is formed in the central direction, and the impact absorption member is made of an elastic material;
a flange type support member which is fixed at the floor while passing through the tubular clamp and is configured to fix together the lower end of the tubular clamp and the impact absorption member;
a cap which includes a main body, and a support part which forms an engaging space part at the lower surface of the main body, wherein an engaging shoulder is formed integral at an end thereof, and the cap is attached detachable to the top of the column member; and
a sensor module which includes a speaker and a detection sensor and operates by a battery, wherein a sensor module is installed at the engaging space part and is fixed by the engaging shoulder,
wherein the tubular clamp includes a tubular body which is provided at the upper end of the tubular clamp and is equipped with a column member insertion hole into which the lower end of the column member is inserted, and an outer diameter extension part which is provide at the lower end of the tubular clamp and expands outward, thus having an outer diameter larger than the tubular body, and
wherein a plurality of screw engaging holes are formed along the outer circumferential surface of the tubular body, and the lower end of the column member is inserted through the column member insertion hole, and a plurality of screws are engaged using a plurality of screw engaging holes, thus fixing the lower end of the column member and the tubular body, and
wherein the impact absorption member is configured in such a way that the upper surface thereof on which the lower end of the tubular clamp is seated and the lower surface thereof contacting with the ground are formed flat, and the outer diameter of the upper surface of the impact absorption member is same as or smaller than the lower end of the tubular clamp, and the outer diameter of the lower surface of the impact absorption member is formed larger than the upper surface of the impact absorption member and is configured in the shape expanded outward, and
wherein the flange type support member includes an upper end cover equipped with a stepped part at the top thereof so as to fixedly hook the outer diameter extension part of the tubular clamp, and a lower end fixing plate which expands outward from the lower side of the upper end cover and is equipped with a plurality of fixing bolt engaging holes to engage a plurality of fixing bolts toward the ground of the floor, and an inclined joint part inclined to reinforce the structure is further provided between the upper end cover and the lower end fixing plate.

2. The protector of claim 1, wherein the pole type protector for a rack protection is provided in a fence type by including a horizontal connection member configured to connect at least a pair of the column member in the horizontal direction, and an extendable member is provided at the longitudinal inner side of the horizontal connection member, wherein it can be extendable in the longitudinal direction in cooperation with the movement of the column member.

* * * * *